United States Patent
Booth et al.

(10) Patent No.: US 11,453,382 B2
(45) Date of Patent: Sep. 27, 2022

(54) SYSTEMS AND METHODS FOR CONTROLLING ENERGY GENERATION IN A HYBRID POWERTRAIN

(71) Applicant: Cummins Inc., Columbus, IN (US)

(72) Inventors: Richard A. Booth, Columbus, IN (US); Martin T. Books, Columbus, IN (US)

(73) Assignee: Cummins Inc., Columbus, IN (US)

( * ) Notice: Subject to any disclaimer, the term of this patent is extended or adjusted under 35 U.S.C. 154(b) by 353 days.

(21) Appl. No.: 16/609,383

(22) PCT Filed: May 1, 2017

(86) PCT No.: PCT/US2017/030413
§ 371 (c)(1),
(2) Date: Oct. 29, 2019

(87) PCT Pub. No.: WO2018/203874
PCT Pub. Date: Nov. 8, 2018

(65) Prior Publication Data
US 2020/0189564 A1    Jun. 18, 2020

(51) Int. Cl.
*B60W 20/10* (2016.01)
*B60W 20/15* (2016.01)
(Continued)

(52) U.S. Cl.
CPC ............ *B60W 20/15* (2016.01); *B60L 58/13* (2019.02); *B60W 10/06* (2013.01); *B60W 10/08* (2013.01);
(Continued)

(58) Field of Classification Search
CPC .... B60W 120/15; B60W 10/06; B60W 20/13; B60W 10/24; B60W 10/08; B60W 20/04;
(Continued)

(56) References Cited

U.S. PATENT DOCUMENTS 7,117,964 B1    10/2006 Kuang et al.
7,228,926 B2    6/2007 Takami et al.
(Continued)

FOREIGN PATENT DOCUMENTS

CN    102270866 A    12/2011
JP    2014184893 A  * 10/2014
(Continued)

OTHER PUBLICATIONS

International Search Report and Written Opinion for International Application No. PCT/US2017/030413, dated Jul. 6, 2017, 9 pages.
(Continued)

*Primary Examiner* — Roger L Pang
(74) *Attorney, Agent, or Firm* — Foley & Lardner LLP

(57) ABSTRACT

An apparatus includes an energy storage circuit, an input circuit, and a hybrid management circuit. The energy storage circuit is structured to receive a state of charge (SOC) and a state of health (SOH) of an energy storage device. The input circuit is structured to receive an indication of a torque demand. The hybrid management circuit is structured to determine a first torque output for a genset including an engine and a first motor-generator based on the torque demand and the SOC of the energy storage device; determine an adjustment factor based on the SOH of the energy storage device; determine an adjusted torque output for the genset based on the adjustment factor and the first torque output; operate the genset to provide the adjusted torque output and to generate an amount of energy; and operate a second motor-generator at a second torque output to meet the torque demand.

20 Claims, 6 Drawing Sheets

(51) Int. Cl.
*B60L 58/13* (2019.01)
*B60W 10/06* (2006.01)
*B60W 10/08* (2006.01)
*B60W 10/24* (2006.01)
*B60W 20/13* (2016.01)

(52) U.S. Cl.
CPC ............ *B60W 10/24* (2013.01); *B60W 20/13* (2016.01); *B60W 2510/083* (2013.01); *B60W 2510/244* (2013.01); *B60W 2710/083* (2013.01)

(58) Field of Classification Search
CPC ..... B60W 2510/083; B60W 2510/244; B60W 2710/083; B60W 2510/248; B60W 2710/0666; B60W 20/10; B60W 10/26; B60W 2510/242; B60K 6/49
USPC .............................................................. 477/3
See application file for complete search history.

(56) References Cited

U.S. PATENT DOCUMENTS

| | | | |
|---|---|---|---|
| 7,285,869 B2 | 10/2007 | Syed et al. | |
| 7,449,891 B2 | 11/2008 | Cawthorne | |
| 7,983,823 B2 | 7/2011 | Heap | |
| 8,473,133 B2 | 6/2013 | Wang et al. | |
| 8,692,507 B2 | 4/2014 | Chen | |
| 8,897,943 B2 | 11/2014 | Sheidler et al. | |
| 2005/0029024 A1 | 2/2005 | Takami et al. | |
| 2007/0162200 A1 | 7/2007 | Zillmer et al. | |
| 2011/0066308 A1 | 3/2011 | Yang et al. | |
| 2011/0298624 A1 | 12/2011 | Bauman et al. | |
| 2012/0208672 A1* | 8/2012 | Sujan ................... | B60W 10/26 477/5 |
| 2013/0218383 A1 | 8/2013 | Martin | |
| 2014/0229043 A1* | 8/2014 | Frank ................... | B60W 20/20 701/22 |
| 2014/0358340 A1 | 12/2014 | Radev | |
| 2015/0239457 A1 | 8/2015 | Dziuba et al. | |
| 2016/0052505 A1 | 2/2016 | Zhou | |

FOREIGN PATENT DOCUMENTS

| | | |
|---|---|---|
| WO | WO-02/058209 | 7/2002 |
| WO | WO-2012/097349 | 7/2012 |
| WO | WO-2015/110129 | 7/2015 |

OTHER PUBLICATIONS

Foreign Action other than Search Report on CN 2017800902074 dated Mar. 25, 2022.

* cited by examiner

SYSTEMS AND METHODS FOR CONTROLLING ENERGY GENERATION IN A HYBRID POWERTRAIN

TECHNICAL FIELD

The present application relates generally to the field of hybrid powertrain control. More particularly, the present application relates to systems and methods for managing energy generation of a genset in a hybrid powertrain in various applications, such as with plug-in hybrid vehicles and the like.

BACKGROUND

Hybrid powertrains can propel a vehicle using one or more electric motor-generators and an internal combustion engine. A first electric motor-generator can mechanically couple to a drivetrain to directly provide power thereto. The internal combustion engine can mechanically couple to a second electric motor-generator to generate and provide electrical energy to an energy storage device and/or the first motor-generator.

SUMMARY

One embodiment relates to an apparatus. The apparatus includes an energy storage circuit, an input circuit, and a hybrid management circuit. The energy storage circuit is structured to receive information regarding a state of charge (SOC) and a state of health (SOH) of an energy storage device structured to store energy. The input circuit is structured to receive an indication of a torque demand. The hybrid management circuit is structured to determine a first torque output for a genset based on the torque demand and the SOC of the energy storage device, the genset including an engine and a first motor-generator; determine a SOH adjustment factor based on the SOH of the energy storage device; determine an adjusted torque output for the genset based on the SOH adjustment factor and the first torque output; operate the genset at a first setpoint to provide the adjusted torque output and to generate an amount of energy; and operate a second motor-generator at a second setpoint to provide a second torque output to meet the torque demand. The second motor-generator is electrically coupled to the genset and the energy storage device such that the second motor-generator is structured to receive at least one of the energy stored by the energy storage device and the energy generated by the genset to provide the second torque output.

Another embodiment relates to a method. The method includes receiving, by a processing circuit, information regarding a state of charge (SOC) and a state of health (SOH) of an energy storage device structured to store energy; receiving, by the processing circuit, an indication of a torque demand; determining, by the processing circuit, a first torque output for a genset including an engine and a first motor-generator based on the torque demand and the SOC of the energy storage device; determining, by the processing circuit, a SOH adjustment factor based on the SOH of the energy storage device; determining, by the processing circuit, an adjusted torque output for the genset based on the SOH adjustment factor and the first torque output; operating, by the processing circuit, the genset at a first setpoint to provide the adjusted torque output and to generate an amount of energy; and operating, by the processing circuit, a second motor-generator at a second setpoint to provide a second torque output to meet the torque demand.

Another embodiment relates to a system. The system includes a controller communicably and operatively coupled to (i) a genset including an engine and a first motor-generator, (ii) an energy storage device structured to store energy, and (iii) a second motor-generator electrically coupled to the genset and the energy storage device. The controller is structured to receive information regarding a state of charge (SOC) and a state of health (SOH) of the energy storage device, receive an indication of a torque demand, determine a first torque output of the genset based on the torque demand, the SOC of the energy storage device, and the SOH of the energy storage device, operate the genset at a first setpoint to provide the first torque output and generate an amount of energy, and operate the second motor-generator at a second setpoint to provide a second torque output to meet the torque demand.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for controlling energy generation in a series hybrid powertrain. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for controlling energy generation in a series hybrid powertrain. According to an example embodiment, the series hybrid powertrain includes (i) a genset having an engine and a first motor-generator, (ii) a second motor-generator, and (iii) an energy storage device. The second motor-generator is electrically coupled to and structured to receive energy from at least one of the genset and the energy storage device to facilitate operation thereof. The series hybrid powertrain may additionally include a controller structured to selectively control (i) an amount of energy generated by the genset that is provided to the second motor-generator and (ii) an amount of energy drawn from the energy storage device by the second motor-generator to provide a torque output via the second motor-generator to meet a torque demand, while maintaining a state of health of the energy storage device at, near, or above a predefined state of health trajectory (e.g., using a power-split algorithm, etc.).

Figure 1:
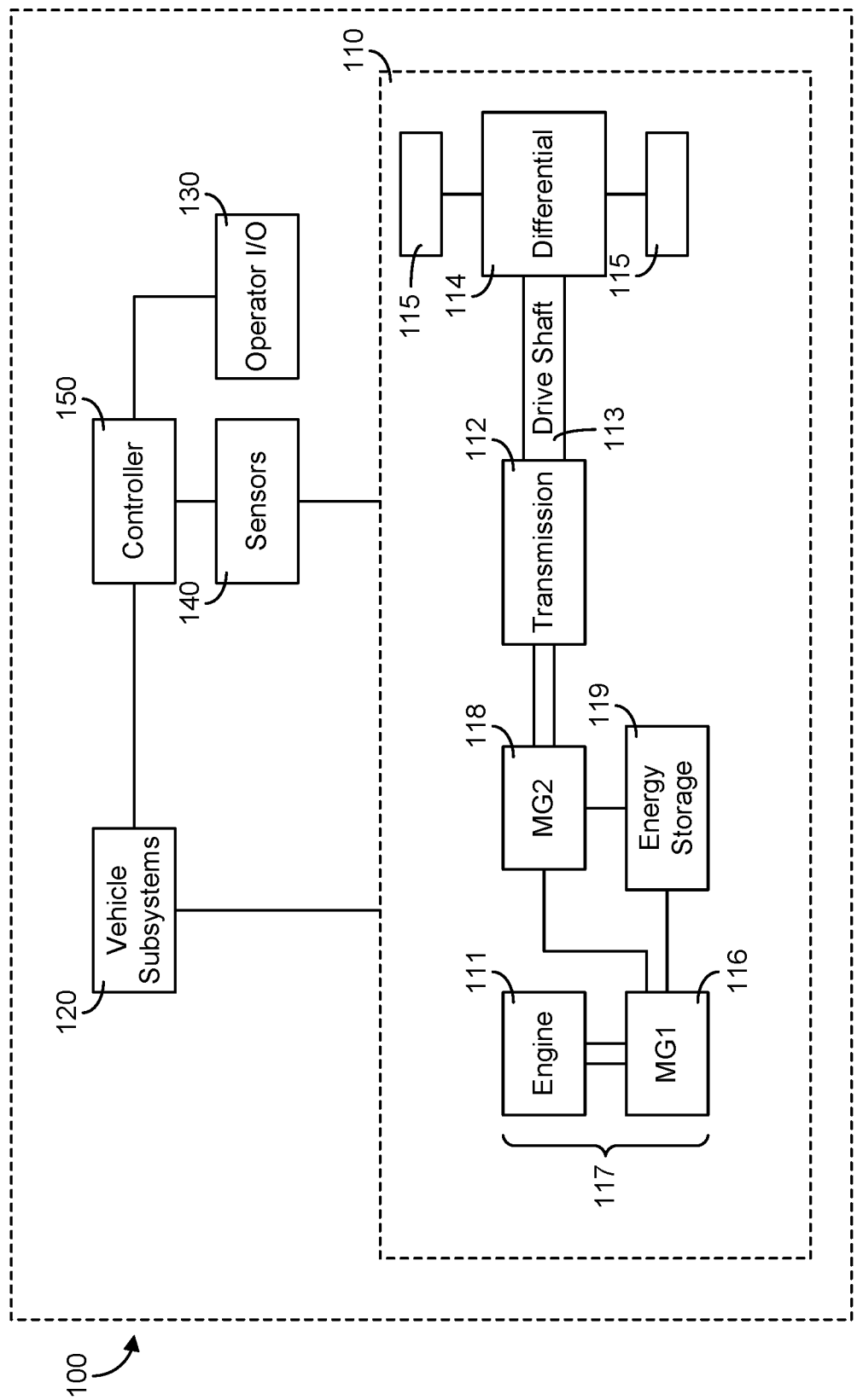
FIG. 1 is a schematic diagram of a vehicle with a controller, according to an example embodiment.

Referring now to FIG. 1, a schematic diagram of a vehicle 100 with a controller 150 is shown according to an example embodiment. As shown in FIG. 1, the vehicle 100 generally includes a powertrain system 110, vehicle subsystems 120, an operator input/output (I/O) device 130, sensors 140 communicably coupled to one or more components of the vehicle 100, and a controller 150. These components are described more fully herein. The vehicle 100 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, delivery trucks, and any other type of vehicle. According to an example embodiment, the powertrain system 110 of the vehicle 100 is structured as a series hybrid powertrain system. In some embodiments, the powertrain system 110 of the vehicle 100 is structured as another type of hybrid powertrain system (e.g., a parallel hybrid powertrain system, etc.).

Components of the vehicle 100 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data regarding one or more of the components shown in FIG. 1. For example, the data may include operation data regarding the operating conditions of powertrain system 110 and/or other components (e.g., a battery system, a motor, a generator, a regenerative braking system, an engine, etc.) acquired by one or more sensors, such as sensors 140. As another example, the data may include an input from operator I/O device 130. The controller 150 may determine how to control the powertrain system 110 based on the operation data.

As shown in FIG. 1, the powertrain system 110 includes an engine 111, a transmission 112, a drive shaft 113, a differential 114, a final drive 115, a first motor-generator 116, a second motor-generator 118, and an energy storage device 119. The engine 111 may be structured as any engine type, including a spark-ignition internal combustion engine, a compression-ignition internal combustion engine, and/or a fuel cell, among other alternatives. The engine 111 may be powered by any fuel type (e.g., diesel, ethanol, gasoline, natural gas, propane, hydrogen, etc.). Similarly, the transmission 112 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission 112 may include a variety of settings (e.g., gears, for a geared transmission) that affect different output speeds based on an input speed received thereby (e.g., from the second motor-generator 118, etc.). Like the engine 111 and the transmission 112, the drive shaft 113, differential 114, and final drive 115 may be structured in any configuration dependent on the application (e.g., the final drive 115 is structured as wheels in an automotive application and a propeller in a boat application, etc.). Further, the drive shaft 113 may be structured as any type of drive shaft including, but not limited to, a one-piece, two-piece, and a slip-in-tube driveshaft based on the application.

As shown in FIG. 1, the engine 111 and the first motor-generator 116 are coupled together (e.g., via a shaft, a gear box, etc.) to form a genset 117. In some embodiments, the first motor-generator 116 is a single device having both generating and motoring capabilities. In some embodiments, the first motor-generator 116 has only generating capabilities. According to an example embodiment, the engine 111 is structured to drive the first motor-generator 116 to generate electrical energy. As shown in FIG. 1, the first motor-generator 116 is electrically coupled to the energy storage device 119 such that the first motor-generator 116 may provide energy generated thereby to the energy storage device 119 for storage. In some embodiments, the first motor-generator 116 is structured to receive stored electrical energy from the energy storage device 119 to facilitate operation thereof. By way of example, the first motor-generator 116 may receive stored electrical energy from the energy storage device 119 to facilitate starting the engine 111.

As shown in FIG. 1, the second motor-generator 118 is coupled to the transmission 112 (e.g., via a shaft, a gear box, etc.). In some embodiments, the powertrain system 110 does not include the transmission 112 and/or the drive shaft 113 such that the second motor-generator 118 is directly coupled to the drive shaft 113 and/or the differential 114. In some embodiments, the second motor-generator 118 is a single device having both generating and motoring capabilities. As shown in FIG. 1, the second motor-generator 118 is electrically coupled to the first motor-generator 116 and the energy storage device 119 such that the second motor-generator 118 may receive energy stored by the energy storage device 119 and/or generated by the first motor-generator 116 to facilitate operation thereof. By way of example, the second motor-generator 118 may receive stored electrical energy from the energy storage device 119 and/or generated electrical energy from the first motor-generator 116 to facilitate providing a torque output to the transmission 112. In some embodiments, the second motor-generator 118 is structured to generate electrical energy for storage in the energy storage device 119. By way of example, the second motor-generator 118 may be structured to utilize a negative torque supply to perform energy regeneration (e.g., when the torque demand therefrom is zero, during engine braking, while the vehicle 100 is coasting down a hill, etc.).

According to an example embodiment, the energy storage device 119 includes one or more batteries (e.g., high voltage batteries, a lead-acid battery, a lithium-ion battery, etc.), one or more capacitors (e.g., super capacitors, etc.), and/or any other energy storage devices. As shown in FIG. 1, the energy storage device 119 is electrically coupled to the first motor-generator 116 and the second motor-generator 118. In some embodiments, the energy storage device 119 is electrically coupled to one or more of the vehicle subsystems 120 (e.g., a regenerative braking system, etc.). The energy storage device 119 may be structured to store electrical energy (i) received from a charging station (e.g., a vehicle charging station, etc.), (ii) generated by the first motor-generator 116, (iii) generated by the second motor-generator 118, and/or (iv) generated by a regenerative braking system. The energy storage device 119 may be structured to provide the stored electrical energy to (i) the vehicle subsystems 120 to operate various electrical based components of the vehicle 100 (e.g., while the engine 111 is running, while the engine 111 is off, etc.), (ii) the first motor-generator 116 to start the engine 111

(e.g., in response to a restart command after a stop-start feature turns off the engine 111, when an operator keys on the engine 111, etc.), and/or (iii) the second motor-generator 118 to provide a torque output to the transmission 112 (e.g., to drive the vehicle 100, etc.).

In a traditional, non-hybrid or electric powertrain system, the engine 111 receives a chemical energy input (e.g., a fuel such as gasoline, diesel, etc.) and combusts the fuel to generate mechanical energy in the form of a rotating crankshaft. The transmission 112 receives the rotating crankshaft and manipulates the speed of the crankshaft (e.g., the engine revolutions-per-minute (RPM), etc.) to affect a desired drive shaft speed. The rotating drive shaft 113 is received by the differential 114, which provides the rotation energy of the drive shaft 113 to the final drive 115. The final drive 115 then propels or moves the vehicle 100. In the powertrain system 110 of the present disclosure, the engine 111 provides mechanical energy to the first motor-generator 116 such that the first motor-generator 116 generates electrical energy. The first motor-generator 116 may provide the generated electrical energy to at least one of the second motor-generator 118 and the energy storage device 119. The second motor-generator 118 receives electrical energy from at least one of the first motor-generator 116 and the energy storage device 119 to generate and provide mechanical energy to the transmission 112.

Referring still to FIG. 1, the vehicle 100 includes the vehicle subsystems 120. In some embodiments, the vehicle subsystems 120 may include the regenerative braking system. The regenerative braking system may include various components structured to generate electricity from vehicle braking events to be stored by the energy storage device 119 for future use (e.g., by the first motor-generator 116, by the second motor-generator 118, by the electrical vehicle components, etc.). The vehicle subsystems 120 may include other components including mechanically driven or electrically driven vehicle components (e.g., HVAC system, lights, pumps, fans, etc.). The vehicle subsystems 120 may also include any component used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

The operator I/O device 130 may enable an operator of the vehicle 100 (or passenger) to communicate with the vehicle 100 and the controller 150. By way of example, the operator I/O device 130 may include, but is not limited to, an interactive display, a touchscreen device, one or more buttons and switches, voice command receivers, and the like. In one embodiment, the operator I/O device 130 includes a brake and an accelerator pedal. The sensors 140 may include sensors positioned and/or structured to monitor operating characteristics of various components of the vehicle 100. By way of example, the sensors 140 may include a sensor structured to facilitate monitoring the state of charge (SOC) and/or the state of health (SOH) of the energy storage device 119, and/or the flow of electricity into and/or out of the energy storage device 119 (e.g., current, voltage, power, etc.).

Figure 2:
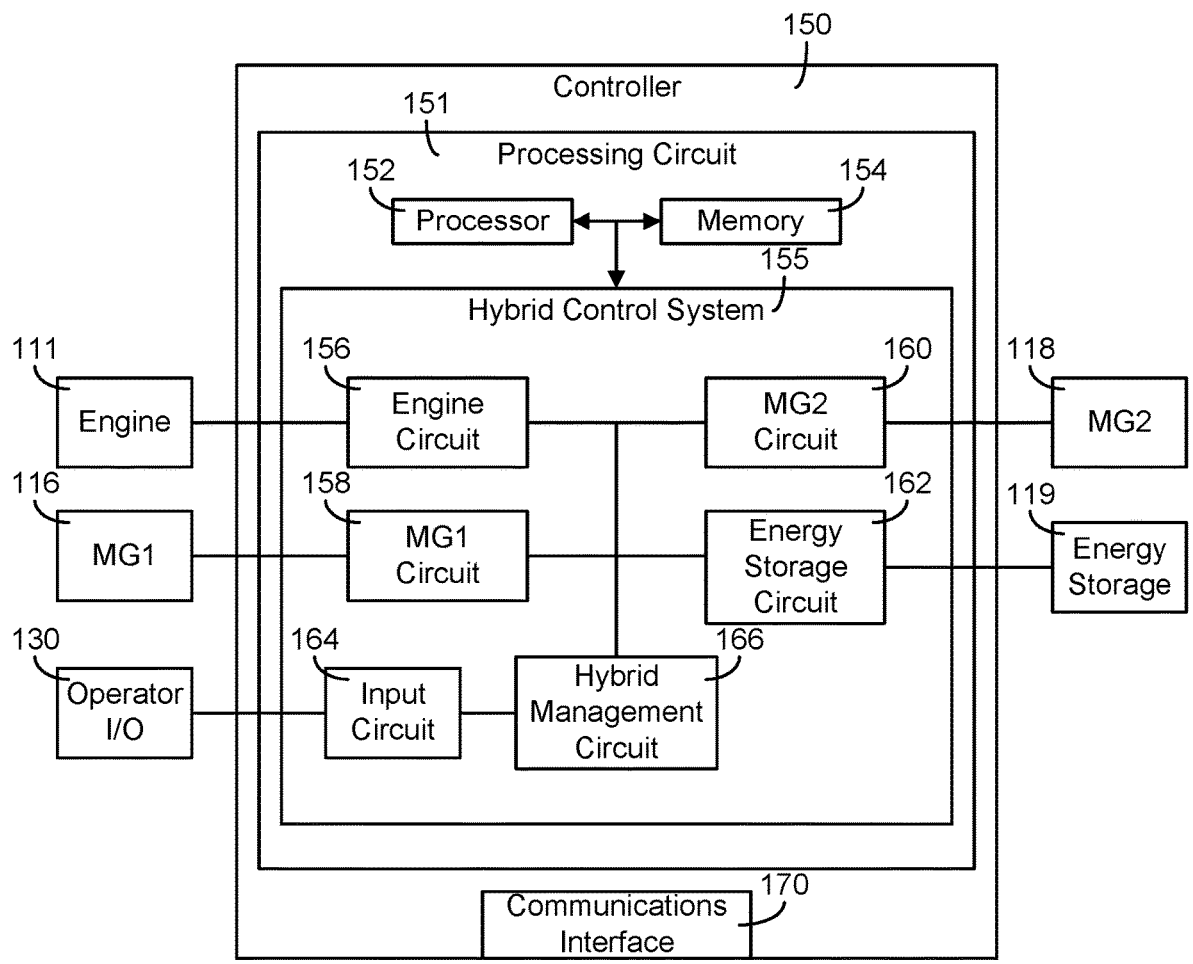
FIG. 2 is a schematic diagram of the controller of the vehicle of FIG. 1, according to an example embodiment.

Referring now to FIG. 2, a schematic diagram of the controller 150 of the vehicle 100 of FIG. 1 is shown according to an example embodiment. As shown in FIG. 2, the controller 150 includes a processing circuit 151 and a communications interface 170. The processing circuit 151 includes a processor 152, a memory 154, and a hybrid control system 155. The processor 152 may be implemented as a general-purpose processor, an application specific integrated circuit (ASIC), one or more field programmable gate arrays (FPGAs), a digital signal processor (DSP), a group of processing components, or other suitable electronic processing components. The memory 154 (e.g., RAM, ROM, Flash Memory, hard disk storage, etc.) may store data and/or computer code for facilitating the various processes described herein. The memory 154 may be communicably connected to the processor 152 and the hybrid control system 155 and structured to provide computer code or instructions to the processor 152 for executing the processes described in regard to the hybrid control system 155 herein. Moreover, the memory 154 may be or include tangible, non-transient volatile memory or non-volatile memory. Accordingly, the memory 154 may include database components, object code components, script components, or any other type of information structure for supporting the various activities and information structures described herein.

The hybrid control system 155 includes various circuits for completing the activities described herein. More particularly, the hybrid control system 155 includes an engine circuit 156, a first motor-generator circuit 158, a second motor-generator circuit 160, an energy storage circuit 162, an input circuit 164, and a hybrid management circuit 166. The circuits 156-166 may be structured to selectively control (i) an amount of energy generated by the genset 117 that is provided to the second motor-generator 118 and (ii) an amount of energy drawn from the energy storage device 119 by the second motor-generator 118 to provide a torque output to the transmission 112 to meet a torque demand, while maintaining the SOH of the energy storage device 119 at, near, or above a SOH trajectory (e.g., using a power-split algorithm, etc.). While various circuits with particular functionality are shown in FIG. 2, it should be understood that the controller 150, the hybrid control system 155, and/or the memory 154 may include any number of circuits for completing the functions described herein. For example, the activities and functionalities of the circuits 156-166 may be embodied in the memory 154, or combined in multiple circuits or as a single circuit. Additional circuits with additional functionality may also be included. Further, it should be understood that the controller 150 may further control other activity beyond the scope of the present disclosure.

According to one embodiment, the circuits 156-166 may include communication circuitry structured to facilitate the exchange of information, data, values, non-transient signals, etc. between and among the circuits 156-166, the engine 111, the first motor-generator 116, the second motor-generator 118, the energy storage device 119, the operator I/O device 130, the sensors 140, and/or other components of vehicle 100. For example, the communication circuitry may include a channel comprising any type of communication channel (e.g., fiber optics, wired, wireless, etc.), and the channel may include any additional component for signal enhancement, modulation, demodulation, filtering, and the like. In this regard, the circuits 156-166 may include communication circuitry including, but not limited to, wired and wireless communication protocols to facilitate reception and transmission of data.

In another embodiment, the circuits 156-166 may include machine-readable media stored by the memory 154 and executable by the processor 152. The machine-readable media facilitates performance of certain operations to facilitate reception and transmission of data. For example, the machine-readable media may provide an instruction (e.g., command, etc.) to the sensors 140, the engine 111, the first motor-generator 116, the second motor-generator 118, the energy storage device 119, the operator I/O device 130, etc. to acquire the data. In this regard, the machine-readable media may include programmable logic that defines the frequency of acquisition of the data. In yet another embodiment, the circuits 156-166 may include any combination of machine-readable content, communication circuitry, the engine 111, the first motor-generator 116, the second motor-generator 118, the energy storage device 119, the operator I/O device 130, the sensors 140, and/or other components of vehicle 100.

Certain operations of the controller 150 described herein may include operations to interpret and/or to determine one or more parameters. Interpreting or determining, as utilized herein, includes receiving values by any method known in the art, including at least receiving values from a datalink or network communication, receiving an electronic signal (e.g., a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The communications interface 170 may include wired or wireless interfaces (e.g., jacks, antennas, transmitters, receivers, transceivers, wire terminals, etc.) for conducting data communications with various systems, devices, or networks. For example, the communications interface 170 may include an Ethernet card and port for sending and receiving data via an Ethernet-based communications network and/or a Wi-Fi transceiver for communicating via a wireless communications network. The communications interface 170 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 170 of the controller 150 may facilitate communication between and among the controller 150, the hybrid control system 155, and components of the vehicle 100 (e.g., the powertrain system 110, the engine 111, the first motor-generator 116, the second motor-generator 118, the energy storage device 119, the operator I/O device 130, the sensors 140, etc.). Communication between and among the controller 150, the hybrid control system 155, and/or the components of the vehicle 100 (e.g., the powertrain system 110, the engine 111, the first motor-generator 116, the second motor-generator 118, the energy storage device 119, the operator I/O device 130, the sensors 140, etc.) may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The engine circuit 156 may be structured to control operation of and/or receive data regarding the operation of the engine 111. In some embodiments, the engine circuit 156 may include or be communicably and operatively coupled to the engine 111 to facilitate controlling operation of the engine 111. By way of example, the engine circuit 156 may be structured to facilitate selectively controlling a torque output and/or a speed output of the engine 111 to power the first motor-generator 116.

The first motor-generator circuit 158 may be structured to control operation of and/or receive data regarding the operation of the first motor-generator 116. In some embodiments, the first motor-generator circuit 158 may include or be communicably and operatively coupled to the first motor-generator 116 to facilitate controlling operation of the first motor-generator 116. By way of example, the first motor-generator circuit 158 may be structured to control whether the energy generated by the first motor-generator 116 is provided directly to the energy storage device 119, provided directly to the second motor-generator 118, or a split between the second motor-generator 118 and the energy storage device 119 (e.g., a first portion of the energy generated by the first motor-generator 116 is provided to the second motor-generator 118 and a second portion of the energy generated by the first motor-generator 116 is provided to the energy storage device 119, etc.). By way of another example, the first motor-generator circuit 158 may be structured to control whether the first motor-generator 116 operates as a motor or a generator (e.g., a generator when the energy storage device 119 and/or the second motor-generator 118 need electrical energy, a motor when the engine 111 needs to be started, etc.).

The second motor-generator circuit 160 may be structured to control operation of and/or receive data regarding the operation of the second motor-generator 118. In some embodiments, the second motor-generator circuit 160 may include or be communicably and operatively coupled to the second motor-generator 118 to facilitate controlling operation of the second motor-generator 118. By way of example, the second motor-generator circuit 160 may be structured to control whether the second motor-generator 118 operates as a motor or a generator (e.g., a generator while a negative torque demand is present, a motor when driving the vehicle 100, etc.). By way of another example, the second motor-generator circuit 160 may be structured to facilitate controlling an output torque provided to the transmission 112 to meet a torque demand (e.g., based on an operator input, etc.).

The energy storage circuit 162 may be structured to receive and interpret data from sensors 140 of the energy storage device 119 to monitor (e.g., determine, estimate, etc.) the SOC and/or the SOH of the energy storage device 119. In some embodiments, the energy storage circuit 162 may include or be communicably coupled to the energy storage device 119 to facilitate receiving the data therefrom. By way of example, the data may include information regarding the input current, input voltage, input power, output current, output voltage, output power, loading, temperature, etc. of the energy storage device 119. The energy storage circuit 162 may use such information to determine the SOC of the energy storage device 119 (e.g., the current energy level within the energy storage device 119, etc.). The energy storage circuit 162 may additionally or alternatively use such information to determine and track the SOH of the energy storage device 119 (e.g., the percent of the total life of the energy storage device 119 that has not yet been consumed, 100% for a new battery, 0% for a used battery that needs to be replaced, etc.).

The input circuit 164 may be structured to receive an indication of a desired torque demand. In some embodiments, the input circuit 164 may include or be communicably coupled to the operator I/O device 130 to facilitate receiving the indication of the desired torque demand therefrom. By way of example, the indication may be provided by an operator via an accelerator pedal position (e.g., the operator pressing on the accelerator pedal to increase speed, etc.).

The hybrid management circuit 166 may be structured to selectively control the genset 117 based on the desired torque demand, the SOC of the energy storage device 119, and the SOH of the energy storage device 119 (e.g., using a power-split algorithm, etc.). By way of example, the hybrid management circuit 166 may be structured to weigh the fuel efficiency of the engine 111 versus the preservation of the SOH of the energy storage device 119 to maintain the SOH of the energy storage device 119 at, near, or above a predefined SOH trajectory for the energy storage device 119. The predefined SOH trajectory may define a trajectory at which the SOH of the energy storage device 119 is desired to follow in order to maintain the energy storage device 119 in an operable condition for at least a predetermined period of time and/or distance. For example, the predefined SOH trajectory may define a trajectory that maintains the energy storage device 119 operable for a predetermined number of hours (e.g., 50,000; 100,000; 200,000; etc. amp-hours). In another example, the predefined SOH trajectory may additionally or alternatively define a trajectory that maintains the energy storage device 119 operable for a predetermined number of miles or kilometers driven by the vehicle 100 (e.g., 36,000; 50,000; 100,000; 200,000; etc. miles or kilometers). In yet another example, the predefined SOH trajectory may additionally or alternatively define a trajectory that maintains the energy storage device 119 operable for a predetermined number of years of ownership of the vehicle 100 (e.g., 3, 5, 10, etc. years). The predetermined number of years of ownership may be based on a warranty period, a government regulation, and/or a customer agreement.

By way of example, the hybrid management circuit 166 may be structured to operate the engine 111 at a less fuel efficient state in favor of generating more energy with the first motor-generator 116 and drawing a lesser amount of energy from the energy storage device 119 to operate the second motor-generator 118 to meet the torque demand in response to the SOH of the energy storage device 119 being below the predefined SOH trajectory. In another example, the hybrid management circuit 166 may be structured to operate the engine 111 at a more fuel efficient state in favor of generating less energy with the first motor-generator 116 and drawing a greater amount of energy from the energy storage device 119 to operate the second motor-generator 118 to meet the torque demand in response to the SOH of the energy storage device 119 being at or above the predefined SOH trajectory.

More specifically, the hybrid management circuit 166 may be structured to determine a first torque output for the genset 117 based on the desired torque demand and the SOC of the energy storage device 119. By way of example, if the SOC of the energy storage device 119 is low (e.g., almost fully depleted, etc.), the genset 117 may generate more electrical energy to meet the torque demand (e.g., less energy may be drawn from the energy storage device 119, etc.). Conversely, if the SOC of the energy storage device 119 is high (e.g., almost fully charged, etc.), the genset 117 may generate relatively less electrical energy to meet the torque demand (e.g., more energy may be drawn from the energy storage device 119, etc.).

The hybrid management circuit 166 may be further structured to determine a SOH adjustment factor based on the SOH of the energy storage device 119. By way of example, the hybrid management circuit 166 may determine the SOH adjustment factor by comparing the SOH of the energy storage device 119 to the predefined SOH trajectory for the energy storage device 119. The hybrid management circuit 166 may then be structured to determine whether the SOH of the energy storage device 119 is above the predefined SOH trajectory or below the predefined SOH trajectory to facilitate maintaining the SOH of the energy storage device 119 at, near, or above the predefined SOH trajectory.

The hybrid management circuit 166 may be further structured to determine (e.g., select, calculate, look-up, etc. using a model, algorithm, look-up table, formula, etc.) a SOH adjustment factor to increase the amount of energy generated by the genset 117 in response to the SOH of the energy storage device 119 being or falling below the predefined SOH trajectory to facilitate maintaining the SOH of the energy storage device 119 at, near, or above the predefined SOH trajectory (e.g., a SOH adjustment factor greater than one, etc.). By way of example, increasing the amount of energy generated by the genset 117 may decrease an amount of energy drawn from the energy storage device 119 by the second motor-generator 118 during operation thereof to meet the torque demand. Additionally, increasing the amount of energy generated by the genset 117 may favor preservation of the SOH of the energy storage device 119 over fuel efficiency of the engine 111 such that the SOH of the energy storage device 119 may move back towards the predefined SOH trajectory (e.g., prevents premature degradation of the energy storage device 119, etc.).

The hybrid management circuit 166 may be further structured to determine (e.g., select, calculate, look-up, etc. using a model, algorithm, look-up table, formula, etc.) a SOH adjustment factor to decrease the amount of energy generated by the genset 117 in response to the SOH of the energy storage device 119 being at or above the predefined SOH trajectory (e.g., a SOH adjustment factor less than one, etc.). By way of example, decreasing the amount of energy generated by the genset 117 may increase an amount of energy drawn from the energy storage device 119 by the second motor-generator 118 during operation thereof to meet the torque demand. Additionally, decreasing the amount of energy generated by the genset 117 may favor fuel efficiency of the engine 111 over preservation of the SOH of the energy storage device 119. Such favoring of fuel efficiency may further increase the fuel efficiency of the vehicle 100 while still remaining at or above the predefined SOH trajectory.

The hybrid management circuit 166 may be further structured to determine an adjusted torque output for the genset 117 based on the SOH adjustment factor and the first torque output. By way of example, the hybrid management circuit 166 may apply the SOH adjustment factor to the first torque output (e.g., multiply the two together, etc.) to determine the adjusted torque output for the genset 117. For example, the hybrid management circuit 166 may be structured to determine an adjusted torque output that is greater than the first torque output in response to the SOH of the energy storage device 119 being below the predefined SOH trajectory. Such an increased torque output may reduce the fuel efficiency of the engine 111, but advantageously assist in returning the SOH of the energy storage device 119 to and/or above the predefined SOH trajectory by drawing a lesser amount of electrical energy therefrom. In another example, the hybrid management circuit 166 may be structured to determine an adjusted torque output that is less than the first torque output in response to the SOH of the energy storage device 119 being at or above the predefined SOH trajectory. Such a decreased torque output may advantageously increase the fuel efficiency of the engine 111 by generating less electrical energy with the first motor-generator 116 and drawing a greater amount of electrical energy from the energy storage device 119 (e.g., until the SOC of the energy storage device 119 drops below a low energy threshold, until the SOH of the energy storage drops below the predefined SOH trajectory, etc.).

The hybrid management circuit 166 may be further structured to send a command to the engine circuit 156 to operate the engine 111 of the genset 117 at a first setpoint that provides the adjusted torque output. The first motor-generator 116 of the genset 117 may thereby generate an amount of energy based on the first setpoint of the genset 117 (e.g., the adjusted torque output of the engine 111, etc.). The hybrid management circuit 166 may be further structured to send a command to the second motor-generator circuit 160 to operate the second motor-generator 118 at a second setpoint that provides a second torque output that satisfies (e.g., provides, meets, etc.) the desired torque demand. The second motor-generator 118 may thereby receive at least one of (i) the generated energy from the first motor-generator 116 of the genset 117 and (ii) the stored energy from the energy storage device 119 to operate at the second setpoint to provide the second torque output.

Figure 3:
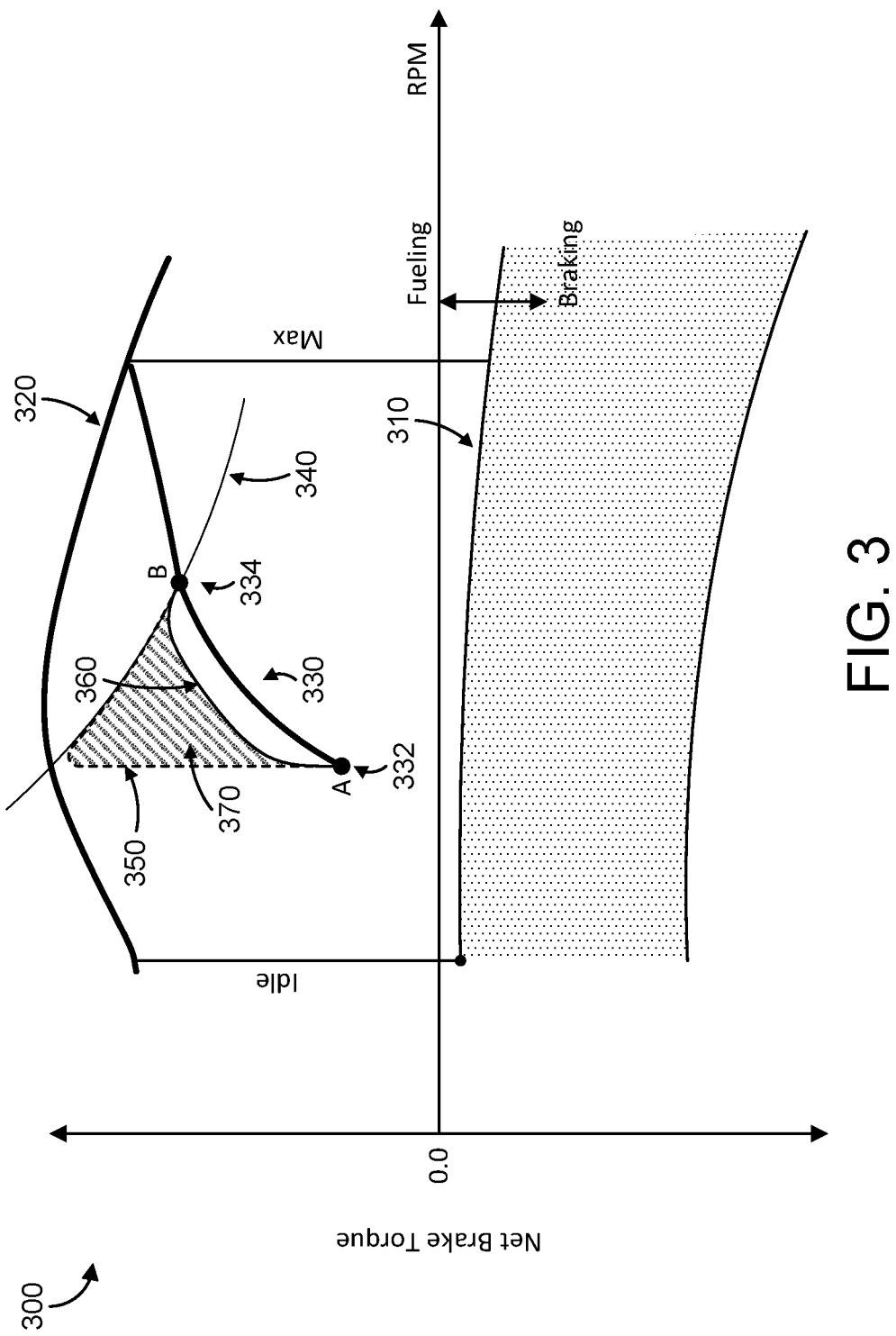
FIG. 3 is a graph depicting various transient power paths for a series hybrid system to meet a torque demand, according to an example embodiment.

Referring now to FIG. 3, a speed versus torque graph 300 depicting various transient power control paths for the engine 111 of the genset 117 to facilitate providing the second torque output via the second motor-generator 118 to meet the desired torque demand is shown according to an example embodiment. As shown in FIG. 3, the graph 300 includes a lower operating line 310, an upper operating line 320, a steady-state operating line 330, a constant power line 340, a first transient power path 350, and a second transient power path 360. The lower operating line 310 and the upper operating line 320 cooperatively define a total operating range for the engine 111. The steady-state operating line 330 defines the optimum fuel efficiency operating line for the engine 111.

As shown in FIG. 3, the steady-state operating line 330 includes a first operating state 332 at Point A and a second operating state 334 at Point B. According to an example embodiment, the first operating state 332 is a minimum power output operating state of the engine 111 and the second operating state 334 is a higher power output operating state of the engine 111. In some embodiments, the engine 111 is operated at the minimum power output operating state (e.g., Point A, etc.) while energy is not needed to be generated by the genset 117 (e.g., unless the engine 111 is commanded to shutdown, etc.). By way of example, the power demand from the engine 111 may increase from the first operating state 332 to the second operating state 334 in response to receiving an input from an operator of the vehicle 100 (e.g., pressing on the accelerator pedal, etc.).

The controller 150 may be structured to implement one of various transient power paths from Point A to Point B to transition the engine 111 from the first operating state 332 to the second operating state 334 based on the first operating state 332, the second operating state 334, the SOC of the energy storage device 119, and/or the SOH of the energy storage device 119. As shown in FIG. 3, the controller 150 may be structured to implement the first transient power path 350, the second transient power path 360, or any transient power path between the first transient power path 350 and the steady-state operating line 330 to transition the engine 111 from the first operating state 332 to the second operating state 334.

By way of example, the controller 150 may be structured to implement the first transient power path 350 in response to the SOC of the energy storage device 119 being below a minimum SOC threshold (e.g., the energy storage device 119 does not have enough stored energy to power the second motor-generator 118, etc.). By way of another example, the controller 150 may be structured to implement the first transient power path 350 in response to the SOH of the energy storage device 119 being below the predefined SOH trajectory. According to an example embodiment, the first transient power path 350 is the least fuel efficient path from the first operating state 332 to the second operating state 334, but minimizes the amount of energy drawn from the energy storage device 119 to operate the second motor-generator 118.

By way of example, the controller 150 may implement the second transient power path 360 in response to the energy storage device 119 having a sufficient SOC and/or the SOH of the energy storage device 119 being at or above the predefined SOH trajectory. According to an example embodiment, the second transient power path 360 is a relatively more fuel efficient path from the first operating state 332 to the second operating state 334, but increases the amount of energy drawn from the energy storage device 119 to operate the second motor-generator 118.

As shown in FIG. 3, the energy output required from the energy storage device 119 when implementing the second transient power path 360 is represented by the area 370 between the first transient power path 350 and the second transient power path 360. Therefore, as the controller 150 implements any transient power path between the first transient power path 350 and the steady-state operating line 330 (e.g., selected based on the SOC and/or SOH of the energy storage device 119, etc.), (i) the closer the transient power path is to the steady-state operating line 330 and further from the first transient power path 350, the engine 111 operates with greater fuel efficiency, producing and providing relatively lower amounts of electrical energy with the first motor-generator 116, while the second motor-generator 118 draws a greater portion of its energy from the energy storage device 119 and (ii) the further the transient power path is from the steady-state operating line 330 and closer to the first transient power path, the engine 111 operates with lower fuel efficiency, producing and providing relatively greater amounts of electrical energy with the first motor-generator 116, while the second motor-generator 118 draws a lower portion of its energy from the energy storage device 119.

Figure 4:
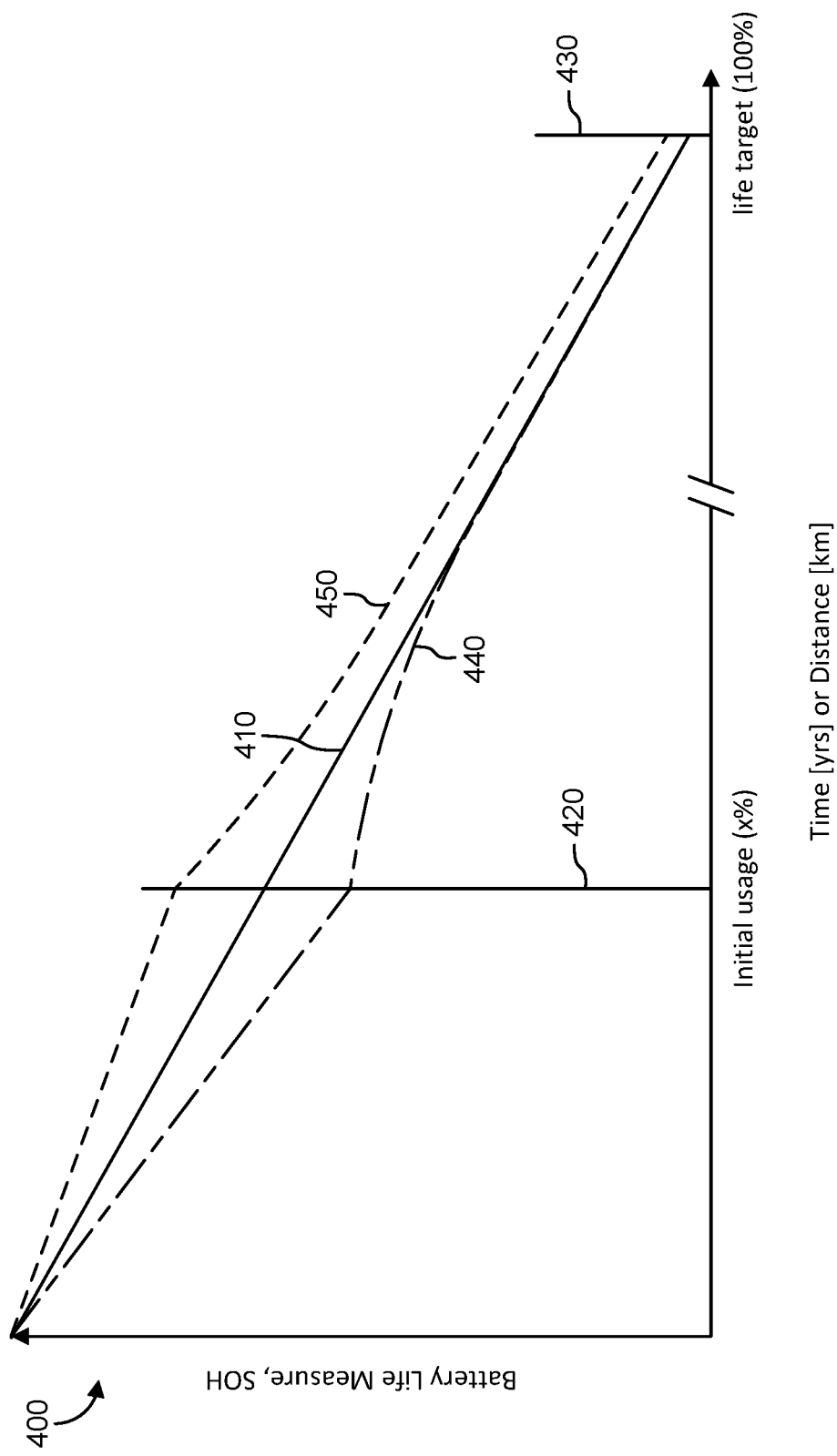
FIG. 4 is a graph depicting various state of health histories for an energy storage device relative to a predefined state of health trajectory, according to an example embodiment.

Referring now to FIG. 4, a graph 400 depicting possible SOH histories for the energy storage device 119 relative to a predefined state of health trajectory is shown according to an example embodiment. As shown in FIG. 4, the graph 400 includes a predefined SOH trajectory 410, an initial usage threshold 420, a life target 430, a first SOH history 440, and a second SOH history 450. According to an example embodiment, the initial usage threshold 420 defines a threshold prior to which the controller 150 provides no correction based on the SOH of the energy storage device 119. By way of example, making corrections with limited SOH history for the energy storage device 119 may otherwise cause the controller 150 to implement inappropriate and/or radical control of the genset 117. The controller 150 may therefore be structured to wait until an adequate SOH history for the energy storage device 119 is recorded. The initial usage threshold may be 5%, 10%, 15%, etc. of the life target 430. According to an example embodiment, the life target 430 defines a minimum desired life in distance (e.g., miles, kilometers, etc.) and/or time (e.g., years, amp-hours, etc.) for the energy storage device 119. According to an example embodiment, the predefined SOH trajectory 410 is a trajectory at which the SOH of the energy storage device 119 is desired to follow in order to maintain the energy storage device 119 in an operable condition until at least the life target 430 is surpassed.

As shown in FIG. 4, the controller 150 does not provide any correction to the first SOH history 440 or the second SOH history 450 until the initial usage threshold 420 is reached. Once the initial usage threshold 420 is reached, the controller 150 may thereafter provide corrections to improve or maintain the SOH of the energy storage device 119 at, near, or above the predefined SOH trajectory 410. As shown in FIG. 4, the first SOH history 440 of the energy storage device 119 indicates that the SOH thereof was below the predefined SOH trajectory 410 at the initial usage threshold 420. The controller 150 may thereafter have controlled the powertrain system 110 such that the genset 117 began generating more energy such that the SOH of the energy storage device 119 improved and moved back towards and/or above the predefined SOH trajectory 410.

As shown in FIG. 4, the second SOH history 450 of the energy storage device 119 indicates that the SOH thereof was above the predefined SOH trajectory 410 at the initial usage threshold 420. The controller 150 may thereafter have controlled the powertrain system 110 such that the genset 117 began generating less energy (e.g., operating with increased fuel efficiency, etc.) as the SOH of the energy storage device 119 was on pace to meet the life target 430. When the SOH of the energy storage device 119 is above the predefined SOH trajectory 410, the usage of the energy storage device 119 may be used without restriction and the usage of the genset 117 may be constrained down to the steady-state operating line 330 to provide optimum fuel efficiency (e.g., operation below the steady-state operating line 330 may provide no fuel efficiency benefits whilst producing lower amounts of electrical energy with the first motor-generator 116, etc.). It should be understood that first SOH history 440 and second SOH history 450 are generalized examples and the SOH of the energy storage device 119 may fluctuate above and/or below the predefined SOH trajectory 410 during real-world implementation (e.g., based on various external factors, energy generation opportunities, SOC at a given time of the torque demand, etc.).

Figure 5A:
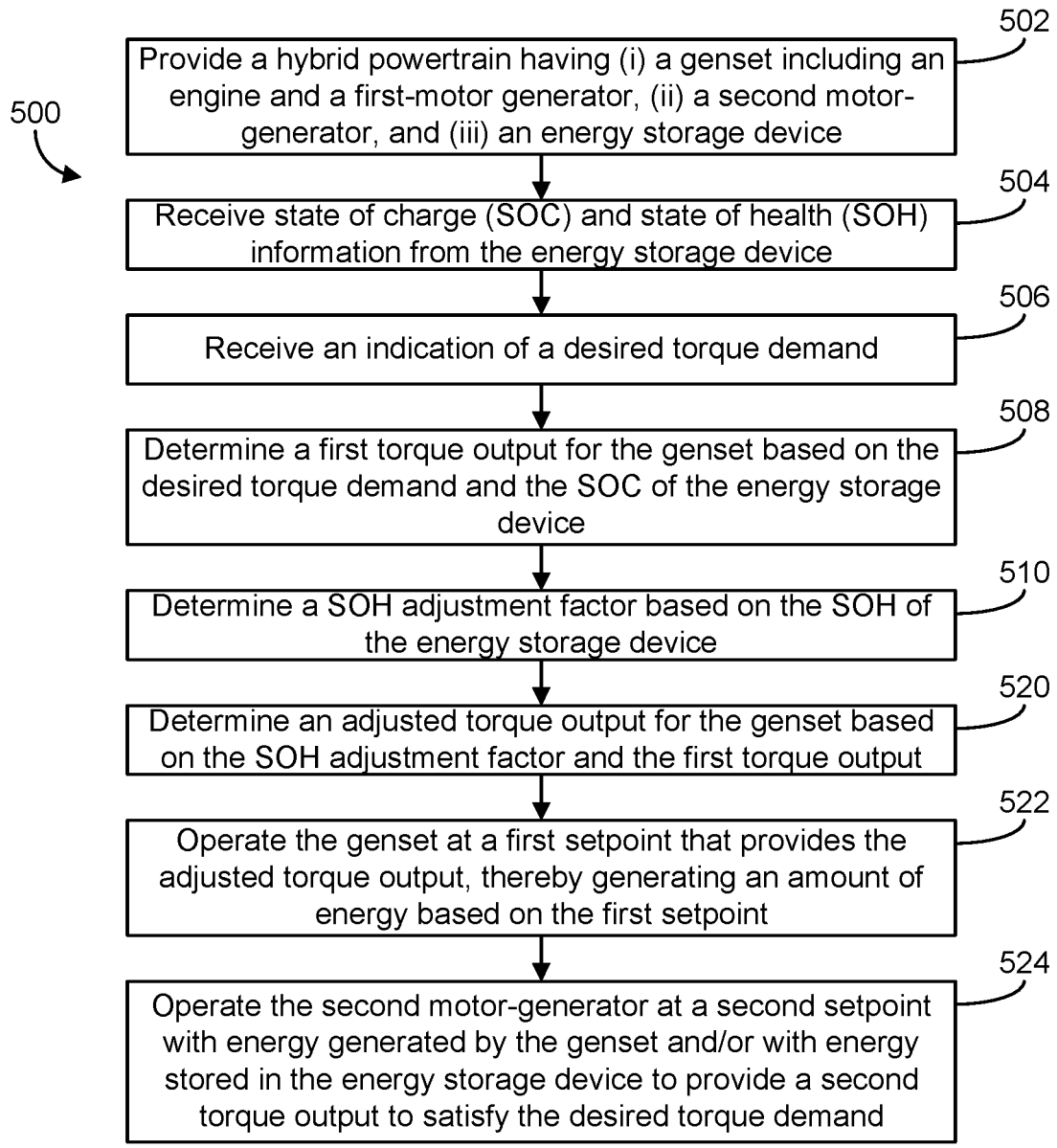
FIGS. 5A and 5B are flow diagrams of a method for dynamically adjusting genset energy generation based on a torque demand, a state of charge of an energy storage device, and a state of health of the energy storage device, according to an example embodiment.
Figure 5B:
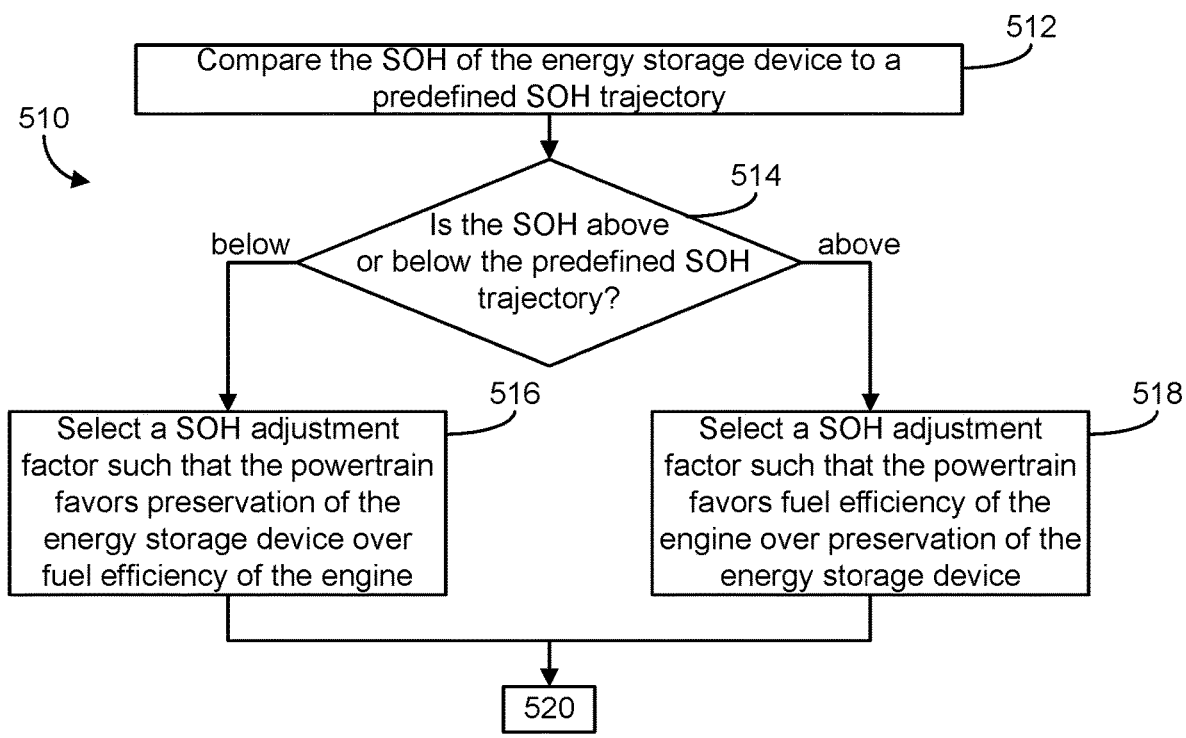

Referring now to FIGS. 5A and 5B, a method 500 for dynamically adjusting genset energy generation based on a torque demand, a SOC of an energy storage device, and a SOH of the energy storage device is shown according to an example embodiment. In one example embodiment, method 500 may be implemented with the vehicle 100 and the controller 150 of FIGS. 1 and 2. As such, method 500 may be described with regard to FIGS. 1 and 2.

At step 502, a hybrid powertrain (e.g., the powertrain system 110, etc.) of a vehicle (e.g., the vehicle 100, etc.) having (i) a genset (e.g., the genset 117, etc.) including an engine (e.g., the engine 111, etc.) and a first motor-generator (e.g., the first motor-generator 116, etc.), (ii) a second motor-generator (e.g., the second motor-generator 118, etc.), and (iii) an energy storage device (e.g., the energy storage device 119, etc.) is provided. According to an example embodiment, the energy storage device is structured to store energy (i) generated by the first motor-generator, the second motor-generator, and/or a regenerative braking system of the vehicle and/or (ii) from a charging station. According to an example embodiment, the second motor-generator is electrically coupled to the genset and the energy storage device such that the second motor-generator may receive energy stored by the energy storage device and/or generated by the first motor-generator to facilitate operation thereof.

At step 504, the controller 150 is structured to receive SOC and/or SOH information from the energy storage device. At step 506, the controller 150 is structured to receive an indication of a desired torque demand. By way of example, the indication of the desired torque demand may be based on an input received from an operator of the vehicle (e.g., a position of an accelerator pedal, etc.). At step 508, the controller 150 is structured to determine a first torque output for the genset based on the desired torque demand and the SOC of the energy storage device.

At step 510, the controller 150 is structured to determine a SOH adjustment factor based on the SOH of the energy storage device. According to an example embodiment, step 510 includes steps 512-518. At step 512, the controller 150 is structured to compare the SOH of the energy storage device to a predefined SOH trajectory for the energy storage device. At step 514, the controller 150 is structured to determine whether the SOH of the energy storage device is above or below the predefined SOH trajectory to facilitate maintaining the SOH of the energy storage device at, near, or above the predefined SOH trajectory. If the SOH of the energy storage device is below the predefined SOH trajectory, the controller 150 is structured to proceed to step 516. If the SOH of the energy storage device is above the predefined SOH trajectory, the controller 150 is structured to proceed to step 518.

At step 516, the controller 150 is structured maintain the SOH of the energy storage device at, near, or above the predefined SOH trajectory by selecting a SOH adjustment factor to increase the amount of energy generated by the genset in response to the SOH of the energy storage device being or falling below the predefined SOH trajectory. By way of example, increasing the amount of energy generated by the genset may decrease an amount of energy drawn from the energy storage device by the second motor-generator during operation thereof. Additionally, increasing the amount of energy generated by the genset may favor preservation of the SOH of the energy storage device over fuel efficiency of the engine such that the SOH of the energy storage device may move back towards the predefined SOH trajectory (e.g., prevents premature degradation of the energy storage device, etc.).

At step 518, the controller 150 is structured maintain the SOH of the energy storage device at, near, or above the predefined SOH trajectory by selecting a SOH adjustment factor to decrease the amount of energy generated by the genset in response to the SOH of the energy storage device being above the predefined SOH trajectory. By way of example, decreasing the amount of energy generated by the genset increases an amount of energy drawn from the energy storage device by the second motor-generator during operation thereof. Additionally, decreasing the amount of energy generated by the genset may favor fuel efficiency of the engine over preservation of the SOH of the energy storage device. Such favoring of fuel efficiency may further increase the fuel efficiency of the vehicle while still remaining at or above the predefined SOH trajectory.

At step 520, the controller 150 is structured to determine an adjusted torque output for the genset based on the SOH adjustment factor and the first torque output. At step 522, the controller 150 is structured to operate the genset at a first setpoint that provides the adjusted torque output, thereby generating an amount of electrical energy based on the first setpoint. As step 524, the controller 150 is structured to operate the second motor-generator at a second setpoint with the energy generated by the genset and/or with the energy stored in the energy storage device to provide a second torque output to satisfy or meet the desired torque demand.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 152 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller 150 of FIGS. 1 and 2), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
    an energy storage circuit structured to receive information regarding a state of charge (SOC) and a state of health (SOH) of an energy storage device structured to store energy;
    an input circuit structured to receive an indication of a torque demand; and
    a hybrid management circuit structured to:
        determine a first torque output for a genset based on the torque demand and the SOC of the energy storage device, the genset including an engine and a first motor-generator;
        determine a SOH adjustment factor based on the SOH of the energy storage device;
        determine an adjusted torque output for the genset based on the SOH adjustment factor and the first torque output;
        operate the genset at a first setpoint to provide the adjusted torque output and to generate an amount of energy; and
        operate a second motor-generator at a second setpoint to provide a second torque output to meet the torque demand, wherein the second motor-generator is electrically coupled to the genset and the energy storage device such that the second motor-generator is structured to receive at least one of the energy stored by the energy storage device and the energy generated by the genset to provide the second torque output.

2. The apparatus of claim 1, wherein determining the SOH adjustment factor includes comparing the SOH of the energy storage device to a predefined SOH trajectory for the energy storage device.

3. The apparatus of claim 2, wherein the hybrid management circuit is further structured to maintain the SOH of the energy storage device at, near, or above the predefined SOH trajectory.

4. The apparatus of claim 3, wherein the hybrid management circuit is further structured to select the SOH adjustment factor to increase the amount of energy generated by the genset in response to the SOH of the energy storage device falling below the predefined SOH trajectory.

5. The apparatus of claim 4, wherein increasing the amount of energy generated by the genset decreases an amount of energy drawn from the energy storage device by the second motor-generator to provide the second torque output.

6. The apparatus of claim 5, wherein increasing the amount of energy generated by the genset favors preservation of the SOH of the energy storage device over fuel efficiency of the engine such that the SOH of the energy storage device moves back towards the predefined SOH trajectory.

7. The apparatus of claim 3, wherein the hybrid management circuit is further structured to select the SOH adjustment factor to decrease the amount of energy generated by the genset in response to the SOH of the energy storage device being above the predefined SOH trajectory.

8. The apparatus of claim 7, wherein decreasing the amount of energy generated by the genset increases an amount of energy drawn from the energy storage device by the second motor-generator to provide the second torque output.

9. The apparatus of claim 8, wherein decreasing the amount of energy generated by the genset favors fuel efficiency of the engine over preservation of the SOH of the energy storage device.

10. A method, comprising:
    receiving, by a processing circuit, information regarding a state of charge (SOC) and a state of health (SOH) of an energy storage device structured to store energy;
    receiving, by the processing circuit, an indication of a torque demand;
    determining, by the processing circuit, a first torque output for a genset based on the torque demand and the SOC of the energy storage device, the genset including an engine and a first motor-generator;
    determining, by the processing circuit, a SOH adjustment factor based on the SOH of the energy storage device;
    determining, by the processing circuit, an adjusted torque output for the genset based on the SOH adjustment factor and the first torque output;
    operating, by the processing circuit, the genset at a first setpoint to provide the adjusted torque output and to generate an amount of energy; and
    operating, by the processing circuit, a second motor-generator at a second setpoint to provide a second torque output to meet the torque demand.

11. The method of claim 10, wherein the second motor-generator is electrically coupled to the genset and the energy storage device such that the second motor-generator receives at least one of the energy stored by the energy storage device and the energy generated by the genset to provide the second torque output.

12. The method of claim 10, wherein determining the SOH adjustment factor includes comparing, by the processing circuit, the SOH of the energy storage device to a predefined SOH trajectory for the energy storage device.

13. The method of claim 12, further comprising maintaining, by the processing circuit, the SOH of the energy storage device at, near, or above the predefined SOH trajectory.

14. The method of claim 13, wherein maintaining the SOH of the energy storage device at, near, or above the predefined SOH trajectory includes selecting, by the processing circuit, the SOH adjustment factor to increase the amount of energy generated by the genset in response to the SOH of the energy storage device falling below the predefined SOH trajectory.

15. The method of claim 13, wherein maintaining the SOH of the energy storage device at, near, or above the predefined SOH trajectory includes selecting, by the processing circuit, the SOH adjustment factor to decrease the amount of energy generated by the genset in response to the SOH of the energy storage device being above the predefined SOH trajectory.

16. A system, comprising:
a controller communicably and operatively coupled to (i) a genset including an engine and a first motor-generator, (ii) an energy storage device structured to store energy, and (iii) a second motor-generator electrically coupled to the genset and the energy storage device, the controller structured to:
receive information regarding a state of charge (SOC) and a state of health (SOH) of the energy storage device;
receive an indication of a torque demand;
determine a first torque output of the genset based on the torque demand and the SOC of the energy storage device;
apply a SOH adjustment factor to the first torque output to determine an adjusted torque output of the genset, the SOH adjustment factor based on the SOH of the energy storage device;
operate the genset at a first setpoint to provide the adjusted torque output and to generate an amount of energy; and
operate the second motor-generator at a second setpoint to provide a second torque output to meet the torque demand.

17. The system of claim 16, wherein the controller is further structured to maintain, based on the SOH adjustment factor, the SOH of the energy storage device at, near, or above a predefined SOH trajectory for the energy storage device.

18. The system of claim 17, wherein the controller is further structured to select the SOH adjustment factor to increase the amount of energy generated by the genset in response to the SOH of the energy storage device falling below the predefined SOH trajectory for the energy storage device.

19. The system of claim 17, wherein the controller is further structured to select the SOH adjustment factor to decrease the amount of energy generated by the genset in response to the SOH of the energy storage device being above the predefined SOH trajectory for the energy storage device.

20. The system of claim 19, wherein the controller is further structured to cause an increase in an amount of energy drawn from the energy storage device by the second motor-generator to provide the second torque output.

* * * * *